United States Patent
Grover

(10) Patent No.: US 9,114,893 B2
(45) Date of Patent: Aug. 25, 2015

(54) SYSTEM AND METHOD FOR ESTIMATING STATES OF SPACECRAFT IN PLANET-MOON ENVIRONMENT

(71) Applicant: Mitsubishi Electric Research Laboratories, Inc., Cambridge, MA (US)

(72) Inventor: Piyush Grover, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 287 days.

(21) Appl. No.: 13/939,658

(22) Filed: Jul. 11, 2013

(65) Prior Publication Data

US 2014/0032018 A1    Jan. 30, 2014

Related U.S. Application Data

(60) Provisional application No. 61/676,035, filed on Jul. 26, 2012.

(51) Int. Cl.
*G01C 23/00* (2006.01)
*B64G 1/66* (2006.01)
*G05D 1/10* (2006.01)

(52) U.S. Cl.
CPC ... *B64G 1/66* (2013.01); *G05D 1/10* (2013.01)

(58) Field of Classification Search
CPC .................................. B64G 1/66; G05D 1/10
USPC ............ 701/3, 13, 14, 531; 244/158.1, 158.4, 244/158.5, 158.6
See application file for complete search history.

(56) References Cited

U.S. PATENT DOCUMENTS

| | | | | |
|---|---|---|---|---|
| 5,158,249 A | * | 10/1992 | Uphoff | 244/158.6 |
| 5,507,454 A | * | 4/1996 | Dulck | 244/158.5 |
| 5,738,309 A | * | 4/1998 | Fowell | 244/171 |
| 5,961,077 A | * | 10/1999 | Koppel et al. | 244/158.5 |
| 6,059,233 A | * | 5/2000 | Koppel et al. | 244/158.5 |
| 6,097,997 A | * | 8/2000 | Belbruno | 701/13 |
| 6,149,103 A | * | 11/2000 | Salvatore et al. | 244/158.5 |
| 6,253,124 B1 | * | 6/2001 | Belbruno | 701/13 |

(Continued)

OTHER PUBLICATIONS

Daum et al. "Particle Flow for Nonlinear with Log-Homotopy." Signal and Data Processing of Small Targets. 2008. Proc. of SPIE vol. 6969, 696918, 2008.

(Continued)

*Primary Examiner* — Gertrude Arthur Jeanglaude
(74) *Attorney, Agent, or Firm* — Dirk Brinkman; Gene Vinokur

(57) ABSTRACT

A method estimates a state of a spacecraft in a planet-moon environment by executing iteratively a particle filter. The particle filter comprising integrates individually states of each particle of the particle filter according to a probability-evolution equation using a model of the state of the spacecraft represented as a planar circular restricted three-body problem and determines a prior probability of each particle as a previous posterior probability of a corresponding particle during a previous iteration. A joint probability distribution of the state of the spacecraft is determines using the states of each particle and the prior probabilities of each particle and the states and the prior probabilities of each particle are updated according to the joint probability distribution of the state of the spacecraft and a measurement of the state of the spacecraft to produce posterior probabilities of each particle.

12 Claims, 11 Drawing Sheets

(56) References Cited

U.S. PATENT DOCUMENTS

| | | | |
|---|---|---|---|
| 6,278,946 B1 * | 8/2001 | Belbruno | 701/531 |
| 6,385,512 B1 * | 5/2002 | Belbruno | 701/13 |
| 6,442,482 B1 * | 8/2002 | Belbruno | 701/531 |
| 6,577,930 B2 * | 6/2003 | Belbruno | 701/13 |
| 6,751,531 B2 * | 6/2004 | Belbruno | 701/13 |
| 6,999,860 B2 * | 2/2006 | Belbruno | 701/13 |
| 7,744,036 B2 * | 6/2010 | Kawaguchi et al. | 244/158.4 |
| 8,655,589 B2 * | 2/2014 | Grover et al. | 701/531 |
| 2001/0025212 A1 * | 9/2001 | Belbruno | 701/13 |

OTHER PUBLICATIONS

Beck et al. "From the Perron-Frobenius Equation to the Fokker-Planck Equation." Journal of Statistical Physics. vol. 79, Nos. 5/6. 1995.

* cited by examiner

SYSTEM AND METHOD FOR ESTIMATING STATES OF SPACECRAFT IN PLANET-MOON ENVIRONMENT

RELATED APPLICATIONS

This application claims priority from a provisional application 61/676,035 for "Efficient Estimation and Uncertainty Quantification in Space Mission Dynamics" filed by Grover et al. on Jul. 26, 2012.

FIELD OF THE INVENTION

This invention relates generally to estimation of states of a spacecraft, and more particularly to estimating positions and velocities of a spacecraft on traveling along a trajectory from an orbit of a planet to an orbit of a moon.

BACKGROUND OF THE INVENTION

Since the first lunar missions in the 1960s, the moon has been the object of interest of both scientific research and potential commercial development. During the 1980s, several lunar missions were launched by national space agencies. Interest in the moon is increasing with the advent of the multi-national space station making it possible to stage lunar missions from low earth orbit. However, continued interest in the moon and the feasibility of a lunar base will depend, in part, on the ability to schedule frequent and economical lunar missions.

A typical lunar mission comprises the following steps. Initially, a spacecraft is launched from earth or low earth orbit with sufficient impulse per unit mass, or change in velocity, to place the spacecraft into an earth-to-moon orbit. Generally, this orbit is a substantially elliptic earth-relative orbit having an apogee selected to nearly match the radius of the moon's earth-relative orbit. As the spacecraft approaches the moon, a change in velocity is provided to transfer the spacecraft from the earth-to-moon orbit to a moon-relative orbit. An additional change in velocity may then be provided to transfer the spacecraft from the moon-relative orbit to the moon's surface if a moon landing is planned.

FIG. 1 is an illustration of orbits of a conventional lunar mission in a non-rotating coordinate system wherein the X-axis 10 and Y-axis 12 are in a plane defined by the moon's earth-relative orbit 36. The Z-axis 18 to the X and Y axes. In the conventional lunar mission, the spacecraft is launched 27 from earth 16 or low earth orbit 20, not necessarily circular, and has sufficient velocity to place the spacecraft into an earth-to-moon orbit 22, which crosses the moon's sphere of influence orbit 30.

Near the moon 14, a change in velocity reduces the spacecraft's moon-relative energy and transfers the spacecraft into a moon-relative orbit 24, which is not necessarily circular. An additional change in velocity transfers the spacecraft from the moon-relative orbit 24 to the moon by way of the moon landing trajectory 25. When an earth-return is desired, a change in velocity is sufficient to place the spacecraft into a moon-to-earth orbit 26 either directly from the moon's surface or indirectly by multiple impulses during the descent. Finally, near the earth 16, a change in velocity reduces the spacecraft's earth-relative energy and returns the spacecraft to low earth orbit 20 or to earth 16, via the earth-return trajectory 27.

Herein the states the spacecraft are defined as positions and velocities of the spacecraft. To estimate the state, various methods have been used. The typical lunar mission is designed within a two-body problem framework, based on the Hohmann transfer as described above. That approach leads to trajectories that can be completed in a few days. However, the Hohmann transfer is suboptimal with respect to fuel consumption. Those trajectories usually tend to tolerate noise, and uncertainties. Estimation methods based on a Kalman filter (such as an extended Kalman filter (EKF), Batch-Kalman filter) have been used to estimate the state of the spacecraft in the presence of noise and uncertainty. Monte-Carlo based particle filters have been used to perform very accurate estimation for some missions, and various design phase studies.

The conventional methods for estimating trajectories have some important drawbacks. For example, the methods that use the Kalman filter techniques are inaccurate due to sensitive dynamics of three-body problem. The methods that use the Monte-Carlo filter are extremely complex computationally.

Recently, advances have been made to obtain greater understanding of a planar circular restricted three-body problem (PCR3BP) that considers the gravity of the moon. There is great interest in utilizing trajectories that can use less fuel than the Hohmann-transfer trajectories. However, the three-body problem is chaotic and highly sensitive to initial conditions, and various types of noise. The resulting trajectories take less fuel than conventional design, but are more sensitive to perturbations. This implies that the spacecraft on one of these trajectories can go off course due to very small perturbations in very short time.

Accordingly, there is a need for a method that can efficiently and accurately estimate spacecraft trajectories from an earth orbit to a moon orbit, and can be used on-board of a space craft for real time estimation of a state of the spacecraft while minimizing fuel consumption.

SUMMARY OF THE INVENTION

It is an object of embodiments of the invention to provide a system and a method for estimating states of a spacecraft transferring from a geostationary transit orbit (GTO) of the earth to an orbit of the moon, in the presence of arbitrary initial and measurement uncertainty distribution. It should be understood that the method can also be used for other planets and moons.

It is an objective of one embodiment to provide estimation of a highly sensitive, low fuel trajectory from GTO to a specified orbit around the moon, within a specified accuracy.

Some embodiments of the invention are based on the realization that the problem of estimating trajectories in a planar circular restricted three-body problem (PCR3BP) with initial and measurement uncertainty is best handled by understanding the geometric properties of the PCR3BP. Because the PCR3BP is a chaotic Hamiltonian system, accurate and efficient estimation can be obtained by studying the nature of particles propagated by the system.

Accordingly, a first embodiment discloses a method for estimating a state of a spacecraft in a planet-moon environment by executing iteratively a particle filter. Each iteration of the particle filter includes integrating individually states of each particle of the particle filter according to a probability-evolution equation using a model of the state of the spacecraft represented as a planar circular restricted three-body problem (PCR3BP); determining a prior probability of each particle as a previous posterior probability of a corresponding particle during a previous iteration; determining a joint probability distribution of the state of the spacecraft using the states of each particle and the prior probabilities of each particle; and updating the states and the prior probabilities of each particle according to the joint probability distribution of the state of the spacecraft and a measurement of the state of the spacecraft to produce posterior probabilities of each particle. The steps of the method are performed by a processor.

Another embodiment discloses a method for estimating a state of a spacecraft in a planet-moon environment. The method performs iteratively a particle filtering of the state of the spacecraft, wherein each iteration includes determining individually positions and probabilities of each particle at a subsequent time step of the particle filtering based on positions and probabilities of each particle at a current time step and a model of a state of the spacecraft represented as a planar circular restricted three-body problem (PCR3BP); determining a joint probability distribution of the state of the spacecraft using the probability of each particle at the subsequent time step; updating homotopically the positions and the probabilities of each particle at the subsequent time step according to the joint probability distribution of the state and a measurement of the state. The steps of the method are performed by a processor.

Yet another embodiment discloses a computer system in a spacecraft including a processor for estimating a state of the spacecraft in a planet-moon environment by executing iteratively a particle filter. Each iteration of the particle filter includes updating individually states of each particle of the particle filter according to Liouville equation using a model of a state of the spacecraft represented as a planar circular restricted three-body problem (PCR3BP); determining prior probability of each particle as posterior probability of each particle at a previous step; determining a joint probability distribution of the state of the spacecraft using the states and the prior probabilities of each particle; and updating the states of each particle according to the joint probability distribution of the state and a measurement of the state.

DETAILED DESCRIPTION OF THE PREFERRED EMBODIMENTS

Various embodiments of the invention determine states of a spacecraft traveling along a trajectory from geostationary transfer orbit (GTO) of a planet to a specified orbit around the moon of the planet, with a specified amount of accuracy. Some embodiments use a planar circular restricted three-body problem (PCR3BP), involving the planet, the moon and the spacecraft as a model of the state of the spacecraft in the planet-moon system. The PCR3BP is a four-dimensional system, and hence each state is uniquely determined by six numbers, e.g., the X, Y and Z coordinates of the positions, and velocities.

An onboard state estimation system necessitates a very computationally efficient algorithm, because the computational capabilities of onboard computers are limited. This is mainly due to the fact that any onboard electronic system needs to be 'space hardened,' i.e. the electronic system has to withstand the radiation levels in space which far exceed those on the Earth. A typical state of the art onboard computer in 2012 is expected to have processor frequency of about 200 MHZ, 2 GB of RAM and 10 GB of solid-state memory. This configuration is clearly much inferior to off the shelf desktop computers available in the market today for regular use.

The onboard analysis of deep space orbits is fundamentally different from analysis of orbits close to Earth. The analysis of deep space orbits requires more complex estimation procedures. This is because three body effects dominate in the deep space orbits, thus increasing the number of possible orbits. Nonlinearities play a very important role in the deep space orbits near Lagrange points, on Lyapunov orbits. Any two trajectories starting in this neighborhood close to each other will diverge rapidly from each other. This highly sensitive nature of the orbits in deep space missions increases the computational demand.

Some embodiments determine the state of the spacecraft at a time step k, where the dynamics of system are given by $$\dot{X} = f(X),$$

$$X = (x, y, z, v_x, v_y, v_z) \quad (1)$$

is the state of spacecraft. In the above equation, x, y, z are coordinates of the positions p, and the velocities v, and "˙" indicates the first derivative. Various embodiments of the invention are based on a realization that the problem of accurate and efficient estimation of the state of the spacecraft can be solved by exploiting the properties of PCR3BP.

Figure 1:
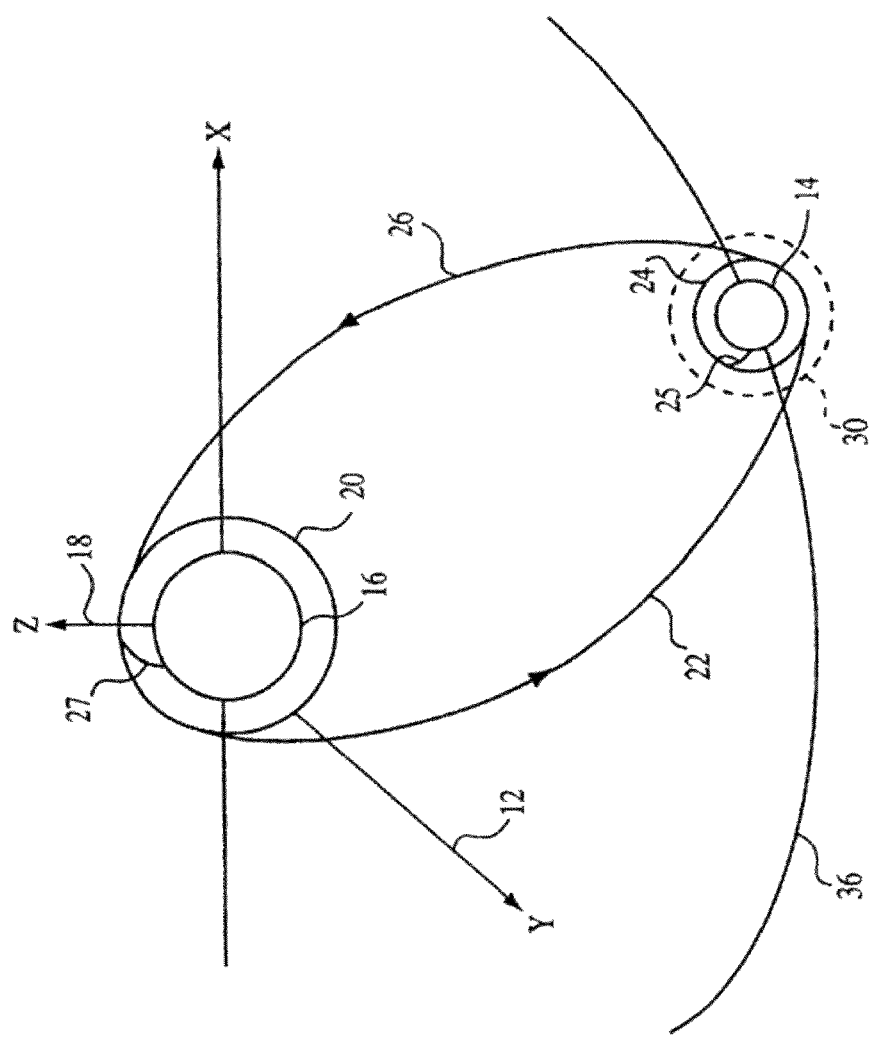
FIG. 1 is a schematic of an orbital system for a conventional lunar mission in a non-rotating coordinate system.
Figure 2:
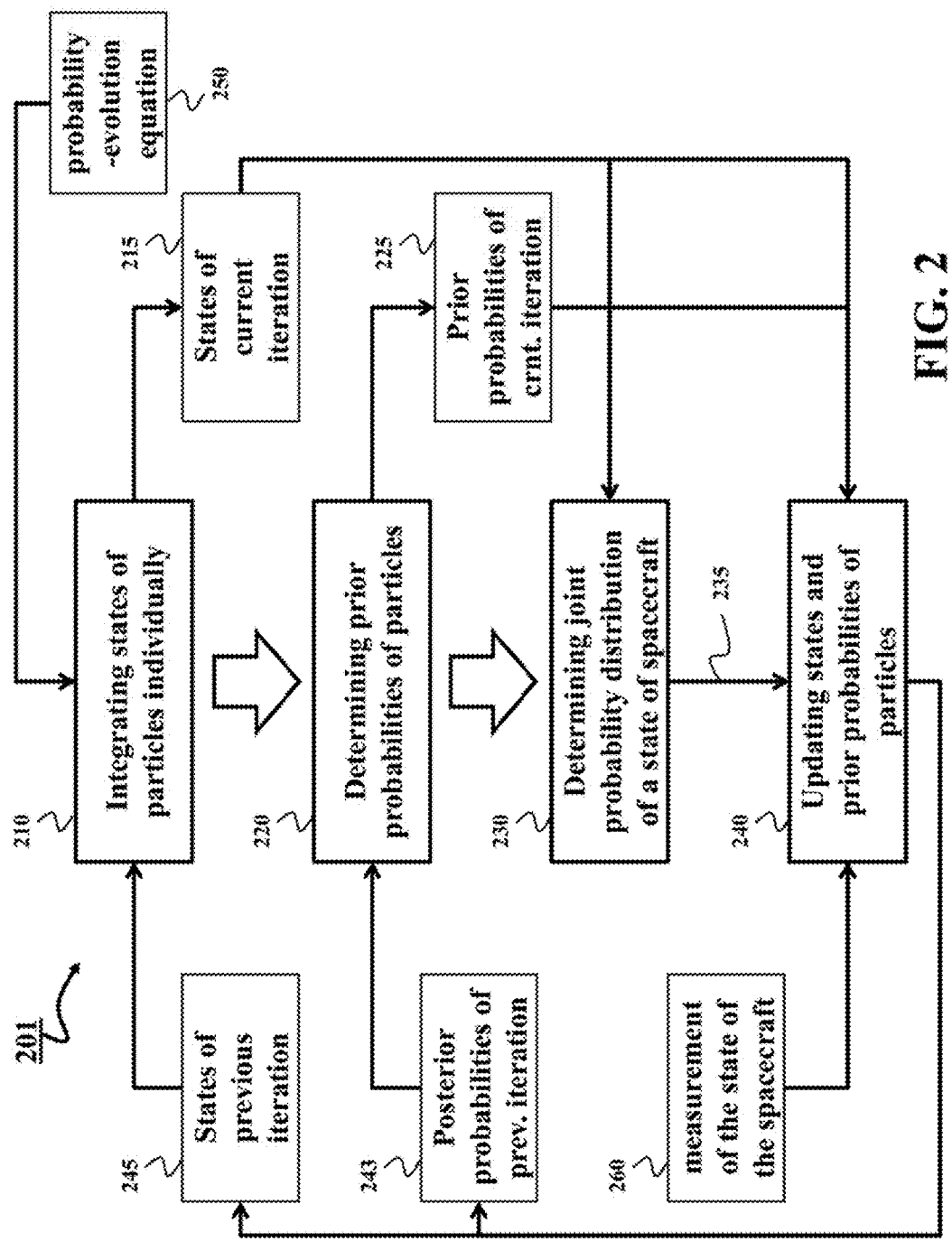
FIG. 2 is a block diagram of a method for determining a state of a spacecraft in a planet-moon environment according to some embodiments of the invention.

FIG. 2 shows a block diagram of a method for determining a state of a spacecraft in a planet-moon environment using a particle filter. According to some embodiments of the invention, the method includes an iterative form of particle filtering and some iterations include several phases described below. Before the first iteration, a certain number of seed points, referred herein as particles, are obtained by, e.g., sampling an initial distribution. Various embodiments of the invention modify the particle filter to be used by an on-board of a space craft for real time estimation of a state of the spacecraft.

Each particle is associated with a state of a particle and a probability of the particle. The particle represents the state of the spacecraft having the state of the particle with the probability equals the probability of the particle. The steps of the method can be performed by an on-board processor 201 executing iteratively the particle filter filtering of the states of the spacecraft.

For a current iteration of the particle filter, the states of each particle of the particle filter are integrated individually 210 according to a probability-evolution equation 250 using a model of a state of the spacecraft represented as the PCR3BP. An input to the integration step 210 includes the states 245 determined 240 during previous iterations. An output of the integration step includes the states of the particles 215 for the current iteration. In addition, the prior probability 225 of each particle for the current iteration is determined 220 as a previous posterior probability 243 of a corresponding particle determined 240 at the previous iteration.

Some embodiments of the invention are based on a realization that in the context of the PCR3BP, the states and probabilities of the particles can be updated individually, i.e., independently of each other. Such integration is contrasted with conventional particle filters where the integration step jointly updates the states and the probability of the particles.

The integration used by some embodiments is based on an observation that PCR3BP is a volume preserving system, and thus the probability of each particle remains constant along the trajectories during the integration step. This observation allows determining prior probability of each particle as a previous posterior probability of a corresponding particle at a previous iteration. The integration step of the particle filter is the most computationally intensive step, and such determination of the prior probability of each particle reduces the computational requirement of the method.

Figure 3:
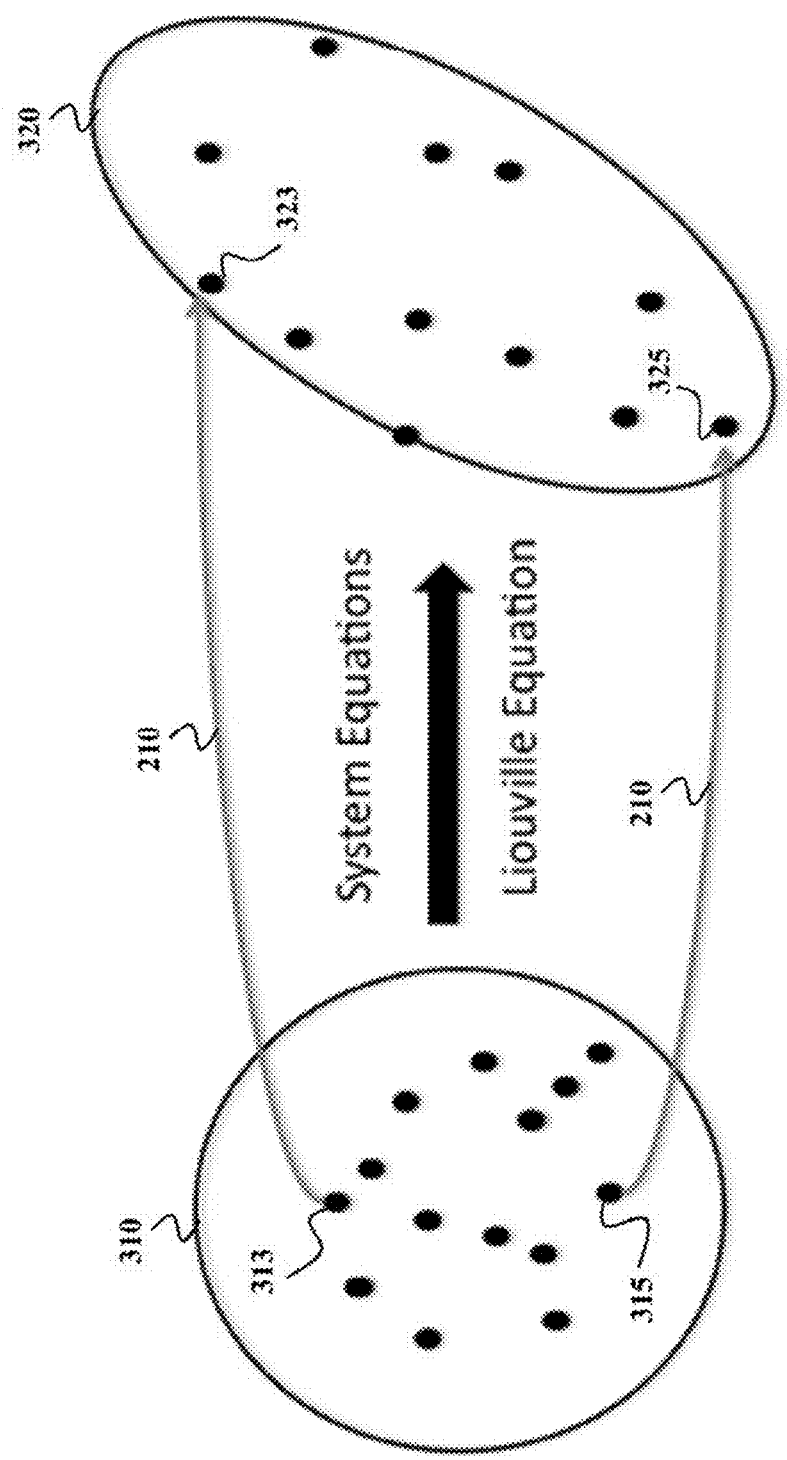
FIG. 3 is a schematic of an integration step of the method of FIG. 2 according to one embodiment of the invention.

FIG. 3 shows a schematic of the integration step 210 that propagates the particles from time step k 310 to time step k+1 320 using the system equation, e.g., Equation (1) representing the PCR3BP equations, and the probability-evolution equation 250. For example, a particle having a state 313 determined during the previous iteration at the time step k is integrated into a particle with a state 323 of the current iteration time step k+1. Similarly, a particle having a state 315 determined during the previous iteration at the time step k is integrated into a particle with a state 325 of the current iteration time step k+1. In various embodiments, the particles are integrated individually and independently from each other.

Some embodiments are based on a realization that solution of the probability-evolution equation 250, e.g., a deterministic Liouville equation along the solution trajectories of the particles, carries out propagation of the respective probabilities according to $$\frac{dp(X(t))}{dt} = -p(X(t))\nabla \cdot f(X(t)). \quad (2)$$

For the class of systems of interest in space missions, such as the CR3BP, the right hand side of Equation (2) is zero. This property follows from the phase space volume preservation during the evolution of volume initial conditions. For systems with radiation pressure, this property is also valid. In case of the PCR3BP, this implies that the probability of each particle remains constant along the trajectories. Thus, the probabilities of the particles are propagated without change. The probability 225 of each particle is called the prior probability.

In the embodiments with the system for which the right hand side of Equation (2) is not zero, the Liouville equation can still be used by integrating the right hand side along each particle trajectory. In some embodiments of this invention, such integration is performed in a parallel manner to decrease the computational complexity.

It is further realized that independent integration of the particles necessitate a subsequent determination of the joint probability distribution of the state of the spacecraft, which can be accomplish having sufficient number of particles of the particle filter. Some embodiments also provide a method for calculating a sufficient number of particles using the Hellinger distance, as described below.

Accordingly, some embodiments of the invention determine 230 a joint probability distribution 235 of the state of the spacecraft using the states of each particle 215 and the prior probabilities of each particle 225. In one embodiment, the joint probability distribution is determined using an interpolation of the prior probabilities of each particle.

Figure 4:
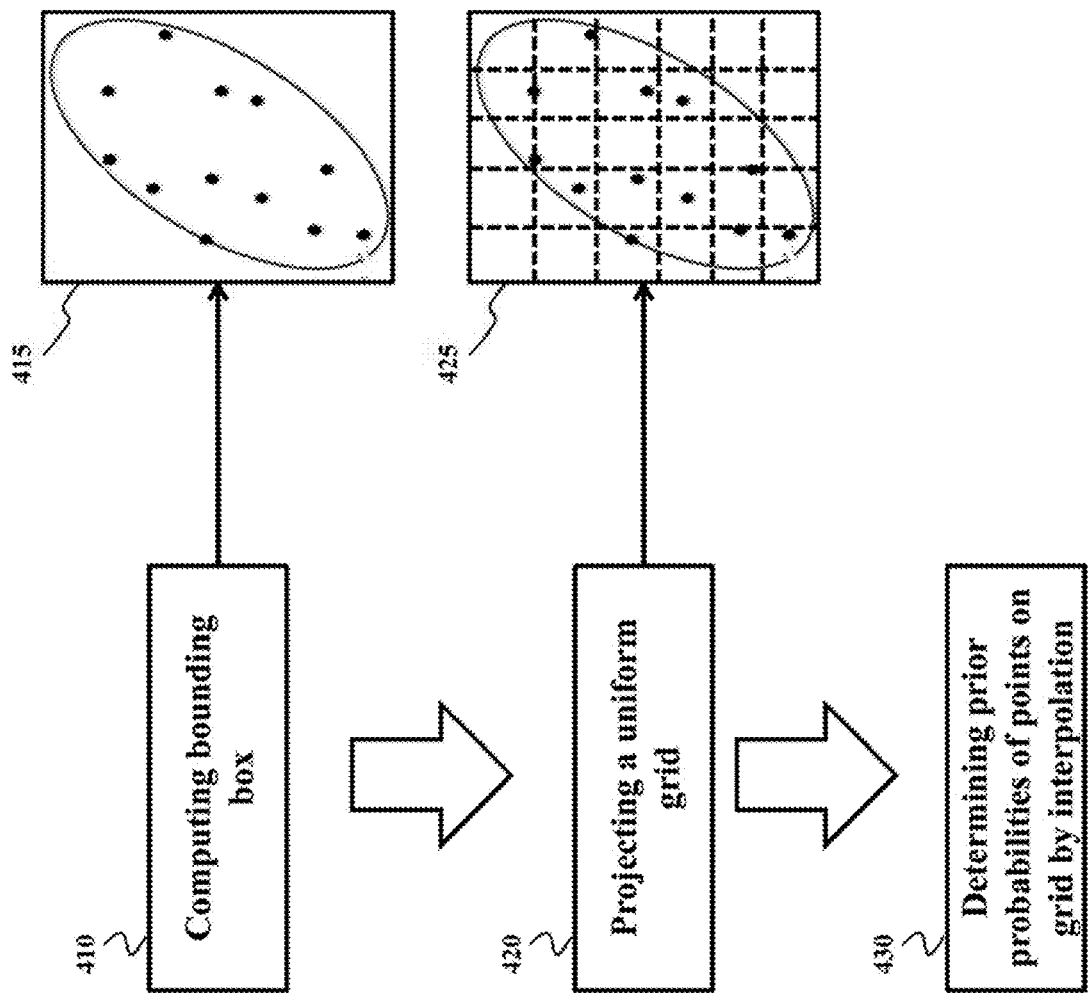
FIG. 4 is a schematic of an interpolation method for determining a joint probability distribution of a state of the spacecraft according to one embodiment of the invention.

FIG. 4 shows a schematic of the interpolation for determining the joint probability distribution 235 according to one embodiment of the invention. This exemplar embodiment uses nearest-neighbor interpolation, where the current positions and prior probabilities of the particles are the input.

The embodiment computes 410 a bounding box 415 around new states of the particles, and projects 420 a uniform grid 425 on the box 415. Prior probabilities for points lying on the grid are calculated 430 using interpolation. For example, a nearest-neighbor interpolation can be used to interpolate the probabilities on a uniform grid inside the bounding box 415. The interpolation provides the discrete representation of the prior joint probability distribution.

The interpolation method is more efficient compared to the methods for computing prior probabilities using histogram based techniques that require larger the number of particles for the same accuracy.

Referring back to FIG. 2, after the joint probability distribution 235 is determined, the embodiments use the joint probability distribution 235 to update 240 the states 215 to produce states 245. The embodiments update 240 the prior probabilities 225 of each particle to produce the posterior probabilities 243 of the each particle. The update 240 is based on a measurement 260 of the state of the spacecraft. For example, in some embodiments, the measurement is an optical range measurement from a planet using very long baseline interferometry (VILB). Other measurements can also be used.

In one embodiment, the measurement 260 is according to $$Y_{k+1} = h(X_{k+1}) + \eta_{k+1} \quad (3)$$

where $X_k$ is the state of spacecraft at time step k, $Y_k$ is the output of the measurement device, and $\eta_k$ is the discrete noise in measurement, and $h$ is a function that maps states to outputs. The initial state can be a known distribution, e.g., a Gaussian distribution with an estimated mean. The noise can be a realization of arbitrary random distribution e.g. Gaussian, Gaussian mixture, or uniform.

In some embodiments, the update 240 is based on an observation that updating weights of the particles to determine their posterior probability is inefficient for PCR3BP system. This is because the spacecraft uses highly sensitive trajectories for low fuel consumption. Due to that sensitivity the conventional particle filter suffers from the problem of particle loss or sample impoverishment. Accordingly, some embodiment updates the states (e.g., positions) of the particle in addition to the probability update to avoid the sample impoverishment.

Figure 5:
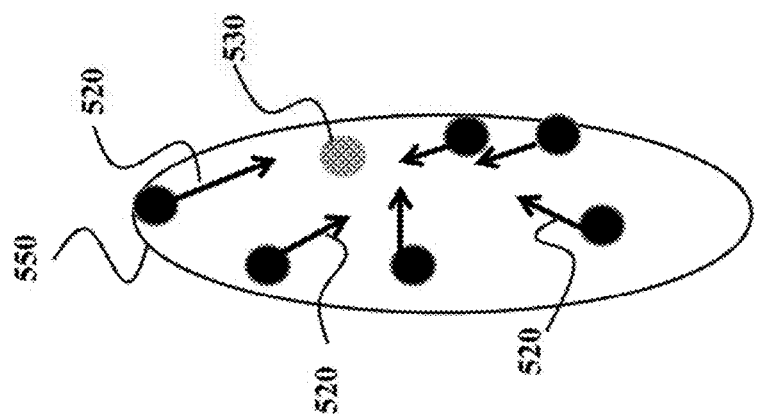
FIG. 5 is a schematic of an update of the state and probability of the particles using homotopy according to one embodiment of the invention.
Figure 5:
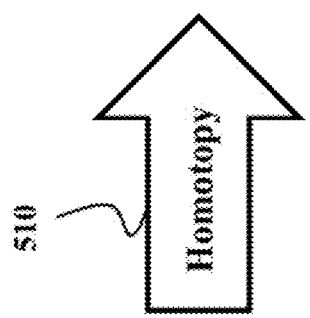
Figure 5:
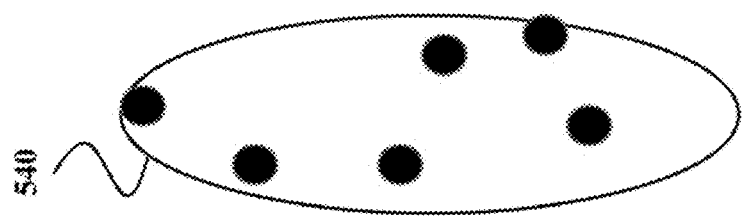

FIG. 5 shows a schematic illustrating an update 240 using the concept of homotopy. This embodiment updates the states and the prior probabilities homotopically 510. Homotopy is a continuous deformation of two continuous functions from one topological space 540 to another 550 as described below in greater detail below. Moving particles 520 homotopically based on the measurements 530 can avoid the phenomenon of particle collapse.

The particle loss or impoverishment occurs when most of the propagated particles have probabilities close to zero. Those particles are unimportant for obtaining the state, and, thus, propagating the particles wastes computational resources. Because CR3BP system is highly sensitive and nonlinear dynamics, the nearby trajectories typically diverge quickly and the rate of the particle loss is very high.

Figure 6:
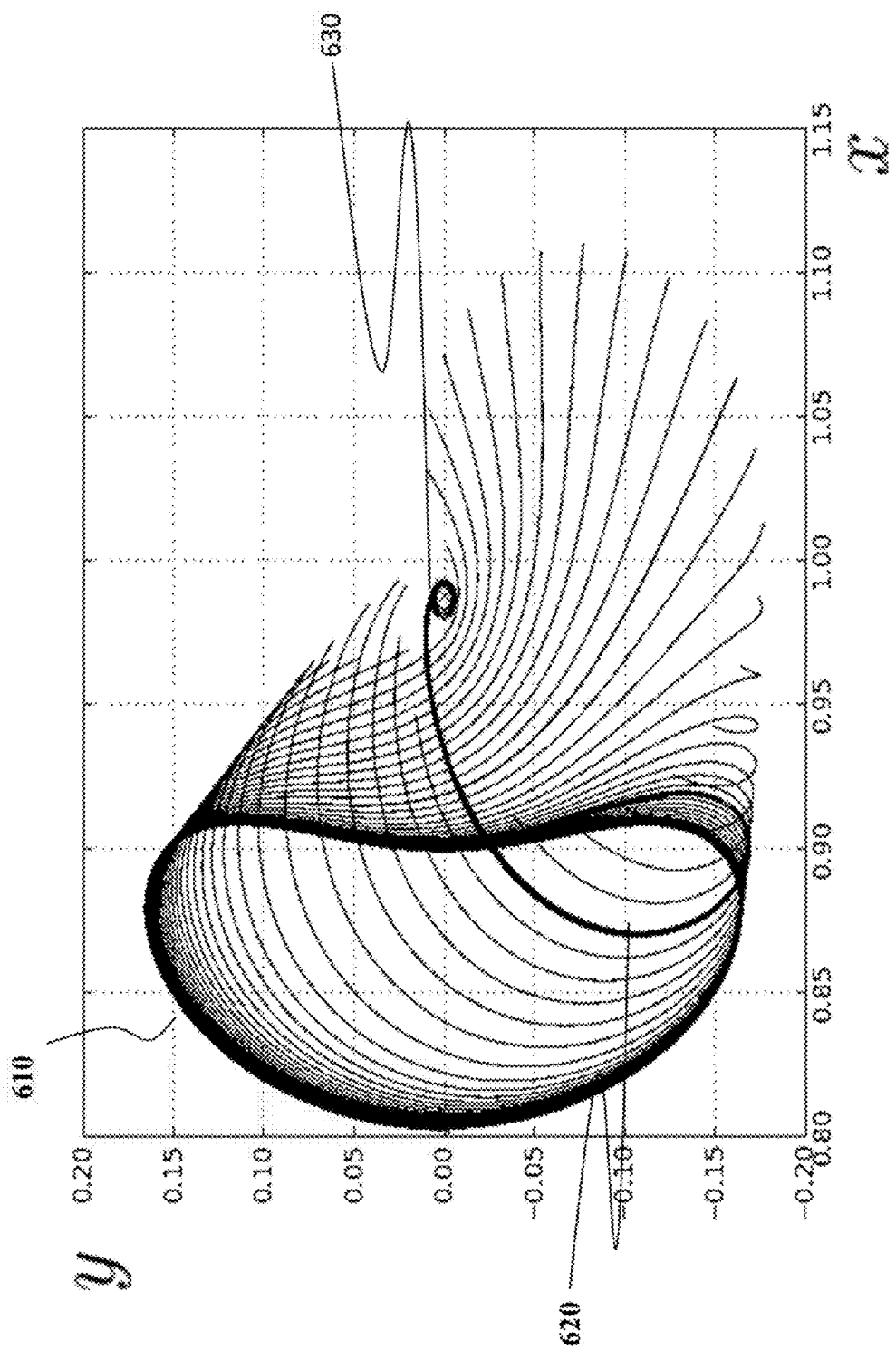
FIG. 6 is a graph of an example of insertion of an spacecraft into a moon-orbit.

FIG. 6 shows an example of insertion 620 of the spacecraft into a moon-orbit 630, starting from a L1 orbit 610. This insertion maneuver is particularly sensitive to noise and disturbance, due to the nonlinear unstable dynamics near the 610 L1 orbit. For example, in a typical moon orbit insertion maneuver, as shown in FIG. 6, the number of effective particle drops from 10000 to 1 in about 3 time steps. The conventional way of dealing with particle loss is to use a sequential importance resampling (SIR) particle filter, which involves resampling whenever the number of effective particles is less than a predetermined threshold. However, that can decrease diversity among particles. This problem is especially severe when the process noise is low compared to the dynamics of the system.

One embodiment solves a differential equation based on Bayes rule update that moves the particles homotopically to a new position after the measurement is received. This move is instantaneous. It is realized that moving the particles to perform the Bayes rule updating avoids particle impoverishment in the CR3BP. One variation of this embodiment determines a number of effective particles $N_{eff}$ according to $$N_{eff} = \frac{1}{\sum_{j=1}^{N} (p_j^{k+})^2},$$

where N is the total number of particles, and $p_j^{k+}$ is the posterior probability of $j_{th}$ particle at $k_{th}$ time step.

One embodiment uses an un-normalized probability according to $$p(x,\lambda) = g(x) h_z(x)^\lambda, \quad (4)$$

where $\lambda$ is the homotopy variable in the range [0 1], g is prior probability distribution and h is a likelihood function. Thus, the homotopy process transforms the prior probability to posterior probability, because the posterior probability is the product of the prior probability and the likelihood function, as described for Bayes rule updating.

Figure 7:
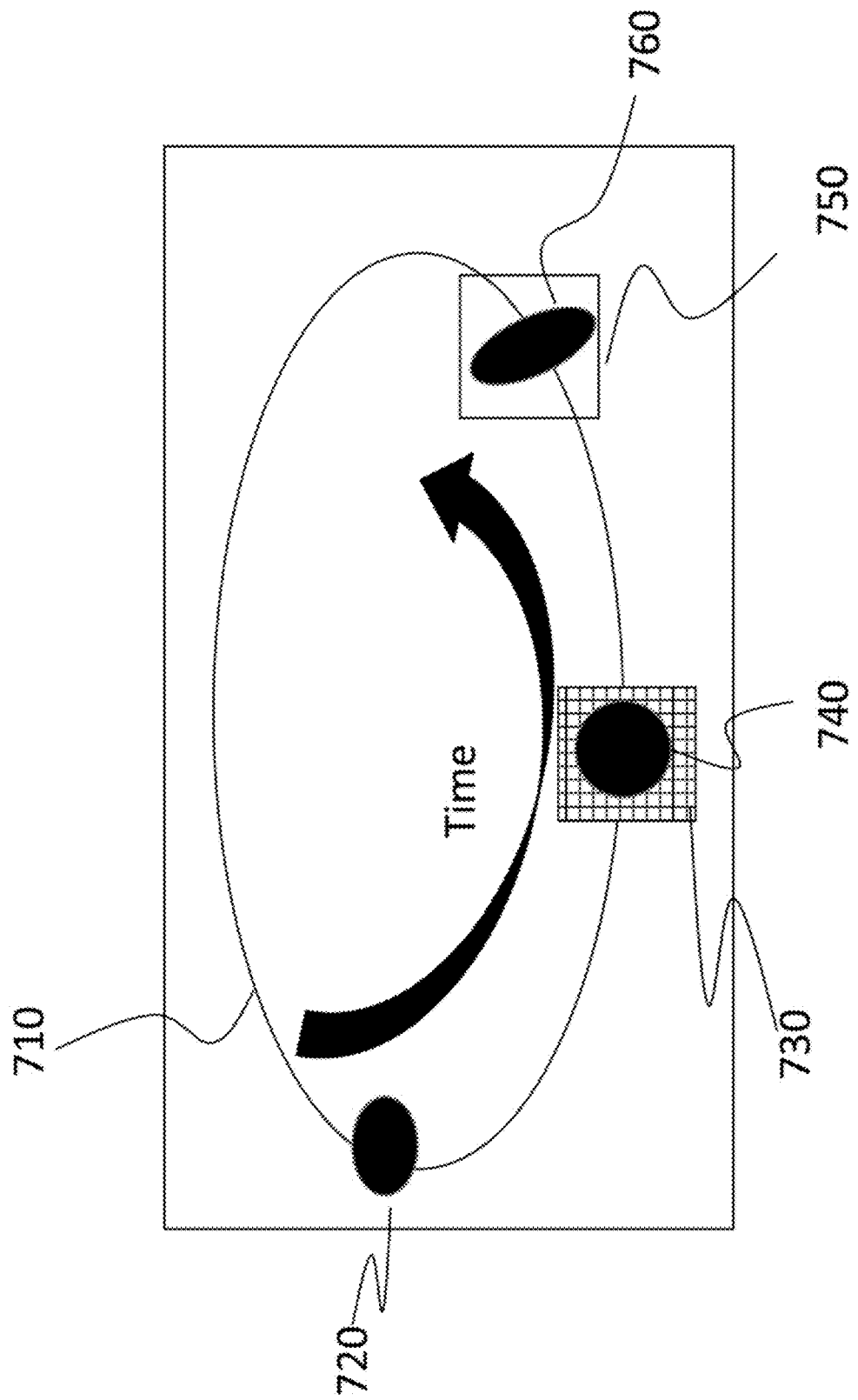
FIG. 7 is a schematic of a posterior computation process using homotopy according to one embodiment of the invention.

FIG. 7 shows the posterior computation process using homotopy and the Hellinger distance search for a typical orbit 710 in the CR3BP according to one embodiment of the invention. Starting with an initial probability distribution 720, the particles are moved 740 using Equation (1), while their prior probabilities at the next step are set to the posterior probability at the current step. A bounding box 730 is computed using the new positions of the particles, and a uniform grid is drawn on the box 730. Prior probabilities for points lying on the grid are calculated using interpolation. Then, an observation is recorded. The particles are then moved within this bounding box and their posterior probabilities are calculated, according to Equation (6). The whole process is then repeated, the particles are moved to a new set 760, with a bounding box 750, and so-on.

Figure 8:
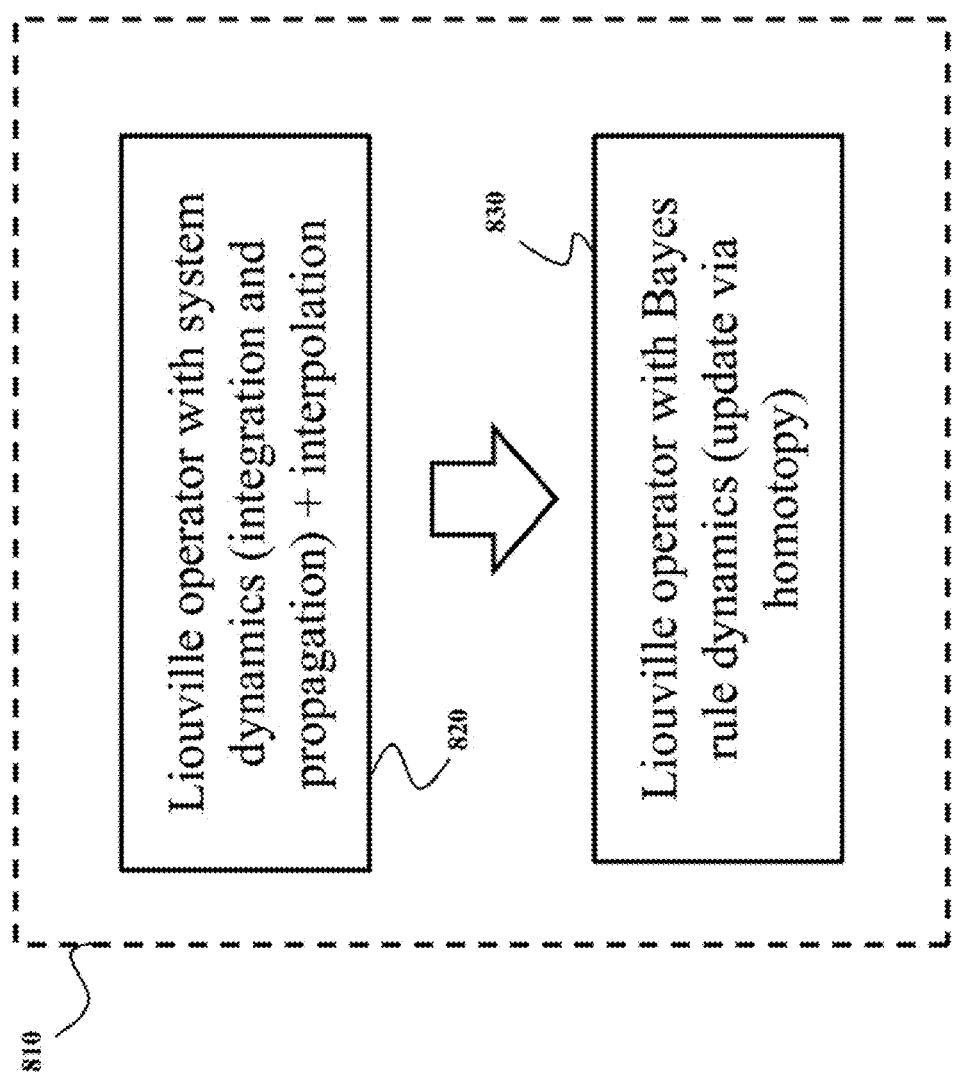
FIG. 8 is a block diagram of a particle filter for determining the state of the spacecraft according to one embodiment of the invention.

FIG. 8 shows a block diagram of a particle filter 810 for determining the state of the spacecraft according to one embodiment. The particle filter can be implemented by an on-board computer system of a spacecraft. The particle filter includes Liouville operator 820 with system dynamics for propagating the particles, integrating the particles and interpolation to obtain joint probability distribution. The particle filter also includes the Liouville operator 830 with Bayes rule dynamics for update the particles using homotopy.

The equation that governs the homotopy process can be the following differential equation $$\log(h) + \frac{\partial \log(p)}{\partial x} F = -\nabla \cdot F, \quad (5)$$

where F is an unknown function that moves the particle as $$\frac{dx}{d\lambda} = F(x, \lambda), \quad (6)$$

and p is the probability at x and the current value of homotopy parameter.

The differential Equation (5) can be solved in a number of ways. In one embodiment of the invention, the extended Kalman filter provides a parameter dependent approximation of function F to solve Equation (5). This approximation of the function F is then used to solve Equation (6) as $\lambda$ varies from 0 to 1.

The solution of the Equation (6) at the end of the process yields the posterior state of the particles, and posterior probabilities of the particles. The resulting probability distribution is the current estimation of the state.

In one embodiment of the invention, the Hellinger distance is used to determine the representation that best resembles the actual posterior representation. This condition is used to simplify the solution of Equation (6), and reduce the size of set of possible solutions. In this embodiment, the interpolated prior probability distribution is homotopically deformed by solving a differential equation that minimizes the Hellinger distance between the true posterior probability, and the posterior probability obtained by multiplying the prior probability and likelihood probabilities.

This differential equation is:

$$\frac{d\theta}{d\lambda} = C \int \frac{\partial p}{\partial \lambda} \log(h) dx,$$

where $\theta$ represents the state of the particles moved during this process, and C is depends on the current particle state and probabilities.

Determining Number of Particles of Particle Filter

Some embodiments of the invention determine a number of particles of the particle filter using the Hellinger distance. In one embodiment, the number of particles required for a given accuracy is reduced eight times compared to a SIR-particle filter in the PCR3BP case.

It is realized that the Hellinger distance is a good measure of the similarity of the probability distributions of the states of the spacecraft. Thus, some embodiments use the Hellinger distance to obtain an estimate of required number of particles, for given accuracy requirements. An estimate of the number of particles required can be computed a priori.

Figure 9:
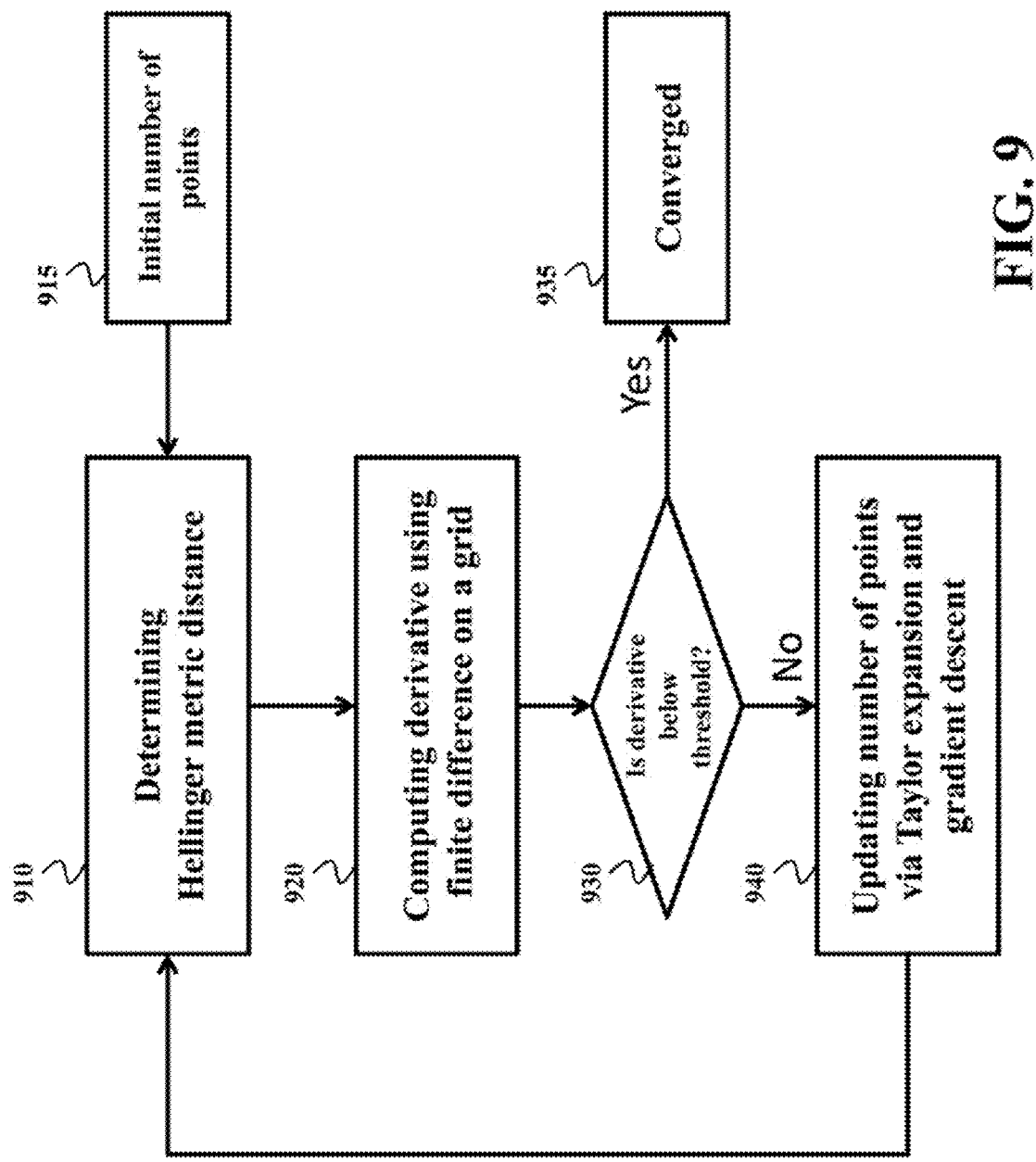
FIG. 9 is a flow chart of a method for determining a number of particles of the particle filter using a Hellinger distance according to one embodiment of the invention.

FIG. 9 shows a flow chart of a method for determining a number of particles of the particle filter using the Hellinger distance. After initial number of particles is determined 915, the Hellinger distance is determined 910 iteratively until the method converges 935. For example, one embodiment uses a discrete version of the Hellinger distance according to $$\rho(H, L(M)) \approx (1/2)\sum_{i=1}^{N_g} (\sqrt{h(x_i)} - \sqrt{l(x_i)})^2 |\delta x|,$$

where H and L are histogram based and Liouville equation based probability distributions, h and l are the respective densities, and $N_g$ is the number of particles on the interpolated grid. $\delta x$ is the grid spacing, $x_i$ is the $i^{th}$ particle on the interpolated grid, and M is the number of particles.

For a desired accuracy, 30,000 particles are required for generating joint prior probability distribution using the conventional histogram approach. In one embodiment of the invention, the Liouville equation with two initial estimates of number of required particles, e.g., 4,000 and 4,200 points is solved.

If the method does not converge, then the embodiment determines a relation to update 940 the number of particles, using a Taylor series expansion:

$$\Delta\rho = (1/2)\sum_{i=1}^{N_g} \left(\frac{\partial l(x_i)}{\partial M}\right)\left(1 - \sqrt{\frac{h(x_i)}{l(x_i)}}\right)|\delta x|\Delta M$$

where $\Delta\rho$ is the change in Hellinger distance.

This relation computes approximately the change in closeness of the distributions L and H, for a given number of particles M used for computing Liouville equation based distribution.

One embodiment computes a derivative term $$\frac{\partial l(x_i)}{\partial M}$$

using finite difference approximation on the grid of point via the two initial estimates. The embodiment compares 930 the derivative with a threshold to determine if the method converged 935. This gradient descent method of obtaining appropriate number of particle usually converges in about three to four iterations.

The graphs in FIGS. 10A, 10B, 10C and 10D compare the estimation errors for four states for the Liouville equation method 1010 using 6,000 points, and histogram based method 1020 using 30,000 points. The value of initial uncertainty ranges from 1 km to 100 km in position, and 1 cm/s to 10 cm/s in velocity. The measurement uncertainty is between 10 cm to 10 m.

Figure 10A:
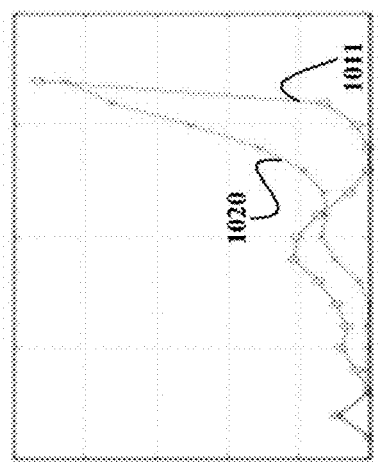
FIGS. 10A, 10B, 10C and 10D are graphs comparing errors of estimation of the state of the spacecraft between the method using Liouville equation and histogram based method.
Figure 10B:
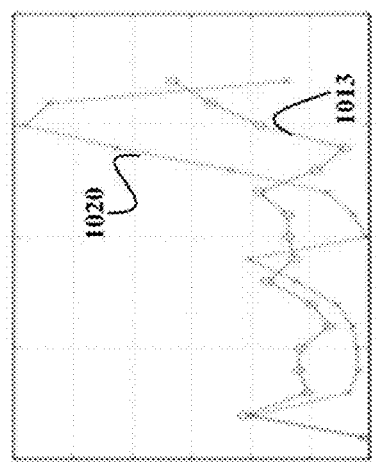
Figure 10C:
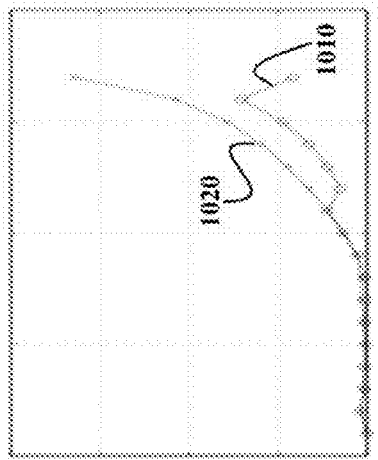
Figure 10D:
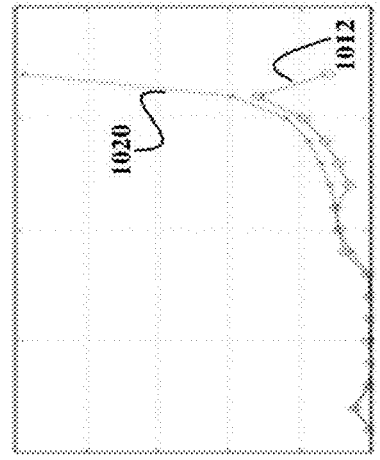

FIG. 10A shows the estimation errors for $p_x$ position determined by Liouville equation method 1010 and histogram based method 1020. FIG. 10B shows the estimation errors for $p_y$ position determined by Liouville equation method 1011 and histogram based method 1021. FIG. 10C shows the estimation errors for $v_x$x velocity determined by Liouville equation method 1012 and histogram based method 1022. FIG. 10D shows the estimation errors for $v_y$ velocity determined by Liouville equation method 1013 and histogram based method 1023.

Figure 11:
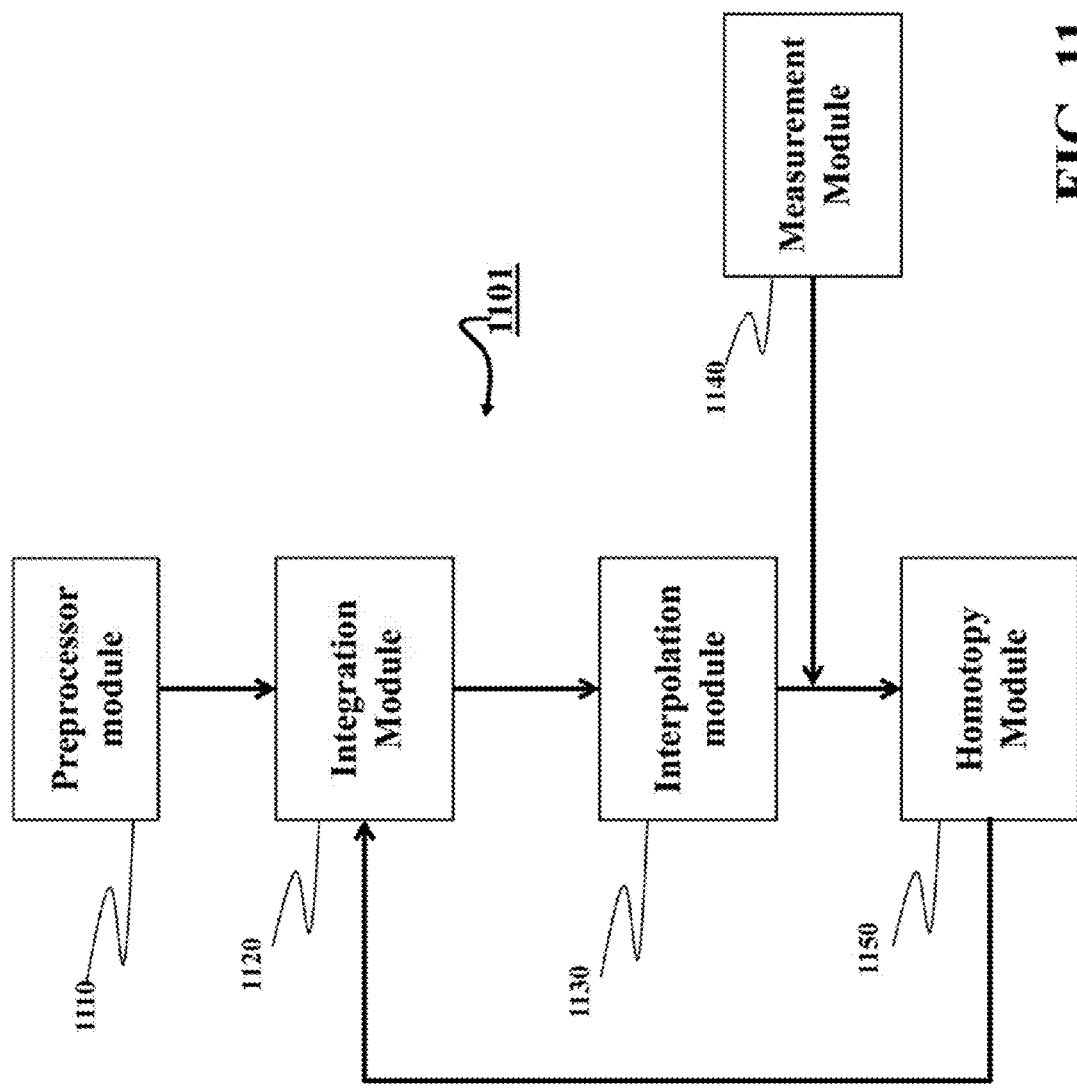
FIG. 11 is a block diagram of a system for determining a state of a spacecraft in a planet-moon environment according to some embodiments of the invention.

FIG. 11 shows a block diagram of an on-board computer system 1100 of a spacecraft. The on-board computer system includes at least one processor 1101 for estimating a state of the spacecraft in a planet-moon environment by executing iteratively a particle filter according to various embodiment of the invention. The system includes a preprocessor module 1110 performing initial computation required to start the filtering process. For example, the module 1110 can determines the number of particles required for the filtering process. An integration module 1120 starts with a current state estimate, and integrates each particle forward in time when the next observation is expected. The probabilities are propagated in time using the Liouville equation to obtain the prior probabilities.

The interpolation module 1130 bounds the prior states of particles, and uses nearest neighbor interpolation to obtain a discrete version of joint probability distribution of the particles. The measurement module 1140 obtains the measurements and forwards the measurements to the filtering system. The module 1140 can obtain noisy measurements using measurement model. The Homotopy module 1150 then uses the measurements and the joint probability distribution to move each particle according to the homotopy equation. The posterior probabilities represent the current estimate of the position of the spacecraft.

The above-described embodiments of the present invention can be implemented in any of numerous ways. For example, the embodiments can be implemented using hardware, software or a combination thereof. When implemented in software, the software code can be executed on any suitable processor or collection of processors, whether provided in a single computer or distributed among multiple computers. Such processors can be implemented as integrated circuits, with one or more processors in an integrated circuit component. Though, a processor can be implemented using circuitry in any suitable format.

Also, the various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, the invention can be embodied as a non-transitory computer-readable medium or multiple computer readable media, e.g., a computer memory, compact discs (CD), optical discs, digital video disks (DVD), magnetic tapes, and flash memories. The terms "program" or "software" are used herein in a generic sense to refer to any type of computer code or set of computer-executable instructions that can be employed to program a computer or other processor to implement various aspects of the present invention as discussed above.

Computer-executable instructions can be in many forms, such as program modules, executed by one or more computers or other devices. Generally, program modules include routines, programs, objects, components, data structures that perform particular tasks or implement particular abstract data types. Typically the functionality of the program modules can be combined or distributed as desired in various embodiments.

Also, the embodiments of the invention can be embodied as a method, of which an example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for estimating a state of a spacecraft in a planet-moon environment by executing iteratively a particle filter, each iteration of the particle filter comprising:
   integrating individually states of each particle of the particle filter according to a probability-evolution equation using a model of the state of the spacecraft represented as a planar circular restricted three-body problem (PCR3BP);
   determining a prior probability of each particle as a previous posterior probability of a corresponding particle during a previous iteration;
   determining a joint probability distribution of the state of the spacecraft using the states of each particle and the prior probabilities of each particle; and
   updating the states and the prior probabilities of each particle according to the joint probability distribution of the state of the spacecraft and a measurement of the state of the spacecraft to produce posterior probabilities of each particle, wherein steps of the method are performed by a processor.

2. The method of claim 1, wherein the updating comprises:
   updating the states and the prior probabilities homotopically.

3. The method of claim 2, further comprising:
   determining iteratively a homotopy function using a Hellinger distance.

4. The method of claim 2, further comprising:

solving $\frac{dx}{d\lambda} = F(x, \lambda)$ subject to constraints on the Hellinger distance, wherein $\lambda$ is a homotopy variable, and x is the state of the spacecraft.

5. The method of claim 1, wherein the joint probability distribution is determined using an interpolation of the prior probabilities of each particle.

6. The method of claim 1, further comprising:
   determining a number of particles of the particle filter using a Hellinger distance.

7. The method of claim 6, further comprising:
   determining a Hellinger distance for the particles; and
   updating the number of particles using a Taylor series expansion.

8. The method of claim 7, further comprising:
   determining the Hellinger distance according to $$\rho(H, L(M)) \approx (1/2) \sum_{i=1}^{N_g} (\sqrt{h(x_i)} - \sqrt{l(x_i)})^2 |\delta x|,$$

wherein H and L are histogram based and Liouville equation based probability distributions, h and l are the respective densities and $N_g$ is the number of particles on an interpolated grid, and $x_i$ is the $i^{th}$ particle on the interpolated grid, $\Box x$ is the grid spacing and M is the number of particles;
   updating the number of particles according to $$\Delta \rho = (1/2) \sum_{i=1}^{N_g} \left(\frac{\partial l(x_i)}{\partial M}\right)\left(1 - \sqrt{\frac{h(x_i)}{l(x_i)}}\right) |\delta x| \Delta M,$$

wherein $\Delta \rho$ is a change of the Hellinger distance.

9. The method of claim 8, further comprising:
   determining the number of particles iteratively until a derivative $$\frac{\partial l(x_i)}{\partial M}$$

is less than a threshold.

10. A method for estimating a state of a spacecraft in a planet-moon environment, comprising:
    performing iteratively a particle filtering of the state of the spacecraft, wherein each iteration comprises:
      determining individually positions and probabilities of each particle at a subsequent time step of the particle filtering based on positions and probabilities of each particle at a current time step and a model of a state of the spacecraft represented as a planar circular restricted three-body problem (PCR3BP);
      determining a joint probability distribution of the state of the spacecraft using the probability of each particle at the subsequent time step; and
      updating homotopically the positions and the probabilities of each particle at the subsequent time step according to the joint probability distribution of the state and a measurement of the state, wherein steps of the method are performed by a processor.

11. A computer system in a spacecraft including a processor for estimating a state of the spacecraft in a planet-moon environment by executing iteratively a particle filter, each iteration of the particle filter comprising:
    updating individually states of each particle of the particle filter according to Liouville equation using a model of a state of the spacecraft represented as a planar circular restricted three-body problem (PCR3BP);
    determining prior probability of each particle as posterior probability of each particle at a previous step;
    determining a joint probability distribution of the state of the spacecraft using the states and the prior probabilities of each particle; and
    updating the states of each particle according to the joint probability distribution of the state and a measurement of the state.

12. The system of claim 11, comprising:
    a preprocessor for determining a number of particles required for the particle filtering;
    an integration module for independently and individually integrating each particle forward in time when a next observation is expected;
    an interpolation module for bounding the prior states of particles and for determining a discrete version of the joint probability distribution of the particles;
    a measurement module for determining measurements of the state of the spacecraft; and a homotopy module for moving each particle according to the homotopy equation based on the measurements and the joint probability distribution.

\* \* \* \* \*